United States Patent [19]

Shoji et al.

[11] 4,414,655
[45] Nov. 8, 1983

[54] SCANNING BEAM CONTROL SYSTEM

[75] Inventors: Robert M. Shoji, Gardena; John S. Chudy, Long Beach, both of Calif.

[73] Assignee: Discovision Associates, Costa Mesa, Calif.

[21] Appl. No.: 249,550

[22] Filed: Mar. 31, 1981

[51] Int. Cl.³ .............................................. G11B 21/10
[52] U.S. Cl. ..................................... 369/44; 360/77; 250/202
[58] Field of Search .......................... 369/44, 43, 111; 360/77; 358/128.5, 342; 250/202; 318/577, 596

[56] References Cited

U.S. PATENT DOCUMENTS

| | | | |
|---|---|---|---|
| 4,138,663 | 2/1979 | Lehureau | 365/215 |
| 4,268,745 | 5/1981 | Okano | 250/204 |
| 4,271,334 | 6/1981 | Yardy | 346/108 |
| 4,338,682 | 7/1982 | Hosaka | 250/202 |

OTHER PUBLICATIONS

Patent Abstract of Japan, vol. 4, No. 74, 30 May 80, p. 3P13.
Patent Abstract of Japan, vol. 2, No. 37, 13 Mar. 78, p. 102E78.
European Patent Abstract 81200105.5, 9/9/81.

*Primary Examiner*—Alan Faber
*Attorney, Agent, or Firm*—Ronald J. Clark

[57] ABSTRACT

A control system for use in controllably adjusting a prescribed characteristic of a beam scanning a record medium. In the preferred embodiments, the control system is embodied in a tracking apparatus for use in a playback system for recovering information from a selected recording track on an optical record medium such as a video disc. The tracking apparatus produces a tracking error signal representative of the deviation of a scanning reading beam from the centerline of the selected track, and couples this error signal to a movable tracking mirror to form a servo for controllably positioning the beam in alignment with the track. The tracking apparatus further includes a dimple compensation circuit for monitoring the tracking error signal and producing a tracking loop disable signal whenever it determines that the reading beam is scanning a video disc defect, such as a dimple. This disable signal is used to uncouple the tracking error signal from the tracking mirror, so that the reading beam is maintained at its current position until the dimple has been passed.

14 Claims, 8 Drawing Figures

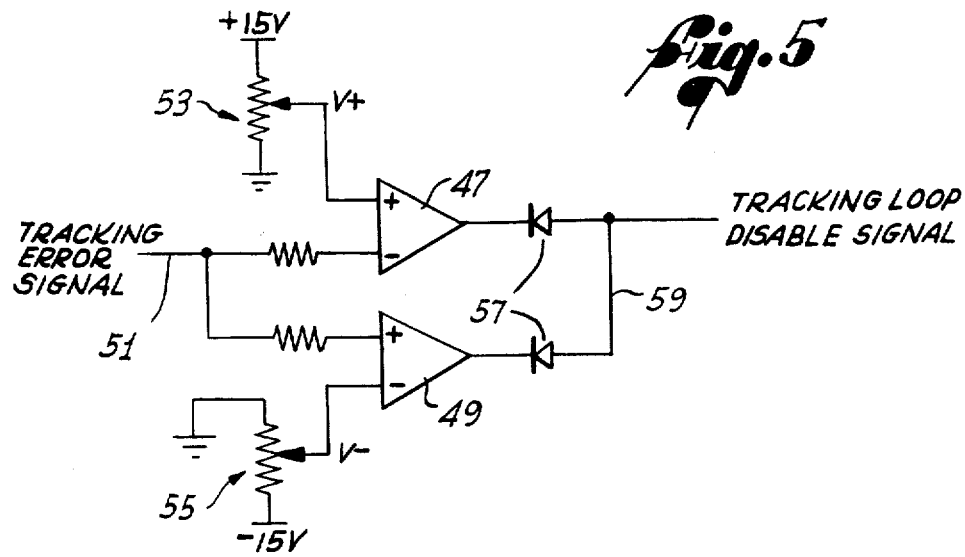
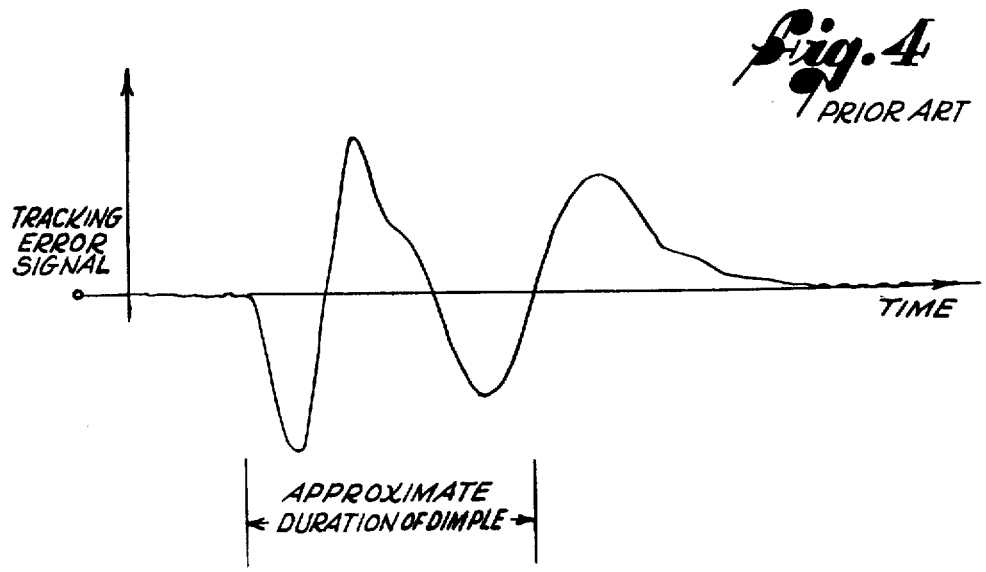

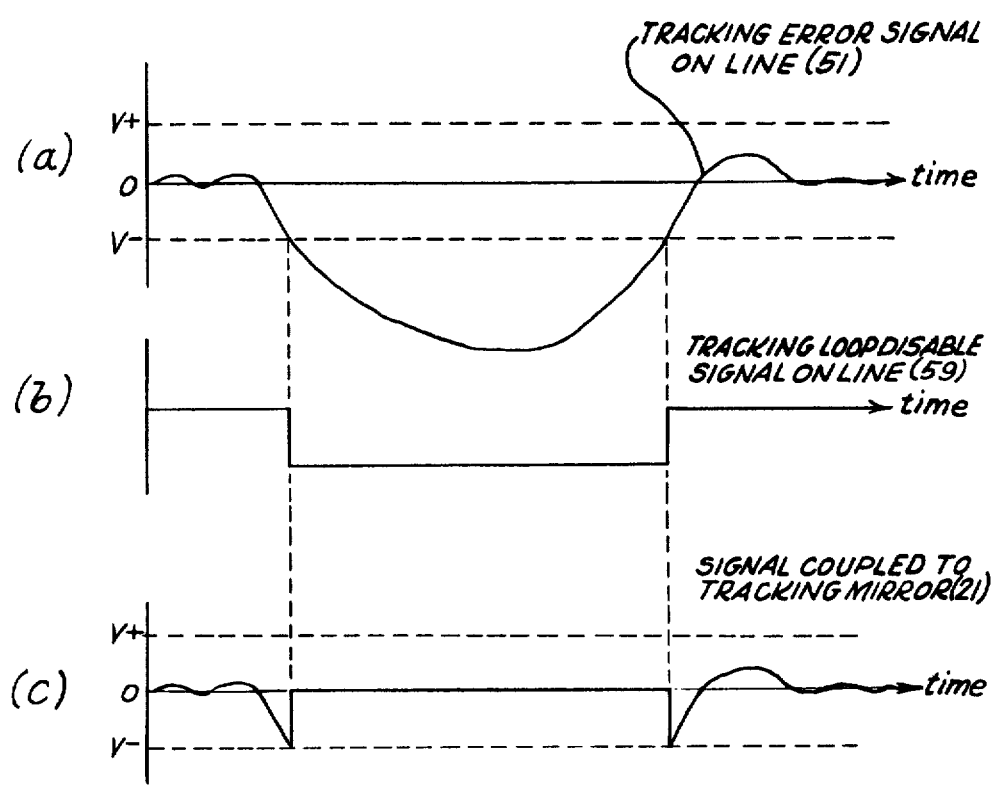

SCANNING BEAM CONTROL SYSTEM

BACKGROUND OF THE INVENTION

This invention relates generally to systems utilizing a beam to scan a record medium, and, more particularly, to systems for controllably adjusting a prescribed characteristic of the beam relative to the record medium.

Systems of this particular type are of special use in video disc playback machines of a type having tracking apparatus for maintaining a beam of light aligned with a selected track on a video disc. An example of such a machine and of one typical prior tracking apparatus is disclosed in U.S. Pat. No. 4,332,022, issued May 25, 1982, entitled "Tracking System For Player", filed Mar. 17, 1980 in the names of Ludwig Ceshkovsky et al. and assigned to the assignee of the present application now U.S. Pat. No. 4,332,022.

The apparatus disclosed in that application directs a reading beam of light via a radially-movable tracking mirror onto a selected one of a plurality of substantially circular and concentric recording tracks on the disc. The beam is reflected in accordance with the recorded information, and the intensity of this reflected beam is detected and suitably processed, to produce a tracking error signal representative of the deviation of the reading beam from the centerline of the selected track. This error signal is coupled back to the tracking mirror, to form a servo for controllably positioning the point of impingement of the beam on the disc in alignment with the centerline of the selected track.

Alternative tracking apparatus are disclosed in U.S. Pat. No. 4,232,201 to L. S. Canino, entitled "Dithered Center Tracking System", and U.S. Pat. No. 4,232,337 to J. S. Winslow et al., entitled "Method and Apparatus for Tracking an Optically Readable Information Track". In both of the disclosed apparatus, a reading beam of light is controllably positioned relative to a selected track on a video disc by a tracking error signal that varies in accordance with the position of the beam relative to the track centerline.

Although the tracking systems described above have proven generally satisfactory in maintaining a reading beam aligned with a selected track on a video disc, they have not been entirely effective when the disc includes defects such as dimples in its information-bearing surface. Dimples are believed to be caused by minute particles being lodged beneath a thin, metallic stamper used in molding the video discs, and they generally cause large groups of adjacent recording tracks to deviate momentarily from their normal radial locations.

Prior tracking apparatus have normally attempted to maintain the reading beam continuously aligned with a selected track, even when scanning in the vicinity of a dimple. However, because of the particular magnitude and duration of the track deviations caused by each dimple, this attempt at continuous alignment sometimes has caused the beam to overshoot the selected track and inadvertently jump to an adjacent track. When the reading beam is scanning a track on the approaching side of a dimple, this track-jumping phenomenon causes the beam to jump back repeatedly to the previously-scanned track. On the other hand, if the reading beam has passed through the center of a dimple and is scanning a track on its far side, this track-jumping phenomenon causes the reading beam to jump to the next succeeding track so that information stored on at least one track is not recovered.

It should be apparent to those knowledgeable in the field of scanning beam control systems, and particularly the field of scanning beam tracking systems, that there is a definite need for a system that can detect and compensate for deviations from normal operation of the specified characteristic being controlled. In particular, it should be apparent from the foregoing that a specific need has existed for a tracking system that includes means for detecting and compensating for record medium defects that otherwise can cause a loss of tracking. The present invention fulfills these needs.

SUMMARY OF THE INVENTION

Basically, and in general terms, the present invention is embodied in an improved apparatus and related method for utilizing a beam to scan a record medium, in which first means are included for controllably adjusting a prescribed characteristic of the beam relative to the medium. In accordance with the invention, the apparatus further includes second means for monitoring the performance of the first means and detecting deviations from normal operation, along with third means, responsive to the detection of deviations by the second means, for shifting the first means to a different operational state.

The invention has particular utility in a tracking apparatus for maintaining the beam aligned with a selected track on the record medium. When a record medium defect causes the track to deviate from its normal direction in a prescribed fashion, the third means temporarily disables the first means from controllably positioning the beam until the defect has been passed. This prevents the beam from jumping inadvertently to an adjacent track on the medium.

More particularly, the tracking apparatus of the invention includes beam steering means for controllably directing the beam onto the record medium, along with means for detecting any deviation of the beam from the selected track and for producing a corresponding tracking error signal. This error signal is coupled back to the beam steering means, to form a servo for aligning the beam in a prescribed position relative to the selected track.

The tracking apparatus further includes means for monitoring the tracking error signal and producing a tracking loop disable signal whenever it determines that a defect of a prescribed type is being scanned, and means responsive to the disable signal for selectively uncoupling the tracking error signal from the beam steering means. The prescribed defects that are particularly detected and responded to by the tracking apparatus are those of a type that cause the selected recording track to deviate momentarily from its normal direction, the deviation being of such a magnitude and duration that the apparatus might otherwise cause the reading beam to jump inadvertently to an adjacent track.

The tracking apparatus has particular utility in a playback machine for use in recovering information from a video disc. A reading beam of light is directed onto the disc by a radially-movable tracking mirror, to produce a reflected beam having an intensity modulated by the recorded information. The intensity of the reflected beam is monitored and processed in a conventional fashion to produce the tracking error signal, which is then coupled back to the tracking mirror, to maintain the reading beam in alignment with the centerline of the selected track. The apparatus is particularly adapted to detect and respond to video disc defects in the form of dimples, which are believed to be generally conically-shaped irregularities in the recording surface of the disc, each extending across as many as several hundred adjacent recording tracks.

In the disclosed embodiments, the monitoring means includes threshold detector means for comparing the tracking error signal to prescribed positive and negative thresholds. In normal operation, when the reading beam scans a dimple-free portion of the video disc, the tracking error signal is at a level intermediate the two thresholds, and the disable signal is not produced. When a dimple is encountered, however, the error signal will ordinarily exceed one of the thresholds, as the selected track deviates a substantial distance away from the scanning reading beam, and the disable signal will therefore be produced.

In one preferred embodiment of the invention, the threshold detector means produces the tracking loop disable signal for as long as either threshold is exceeded. The disable signal is coupled to an analog switch to selectively uncouple the tracking error signal from the radially-movable tracking mirror. When this occurs, the reading beam is maintained at its current radial location, and the tracking apparatus does not attempt to follow the deviating path of the selected track. Thereafter, when the tracking error signal returns to its normal level intermediate the two thresholds, the tracking apparatus again functions as a closed loop control system to controllably position the reading beam in alignment with the selected track.

In an alternative embodiment of the invention, the apparatus further includes a monostable multivibrator device. This device is triggered whenever the tracking error signal exceeds either of the positive and negative thresholds, to produce a tracking loop disable signal having a prescribed duration. The disable signal is coupled to an analog switch, to selectively uncouple the tracking error signal from the radial tracking mirror for a duration corresponding generally to the normal duration of a dimple.

Other aspects and advantages of the present invention should become apparent from the following description of the preferred embodiments, taken in conjunction with the accompanying drawings, which disclose, by way of example, the principles of the invention.

BRIEF DESCRIPTION OF THE DRAWINGS

FIG. 4 is a graph of a tracking error signal produced by tracking apparatus of the prior art when the reading beam encounters a typical dimple;

FIG. 5 is a schematic circuit diagram of one preferred embodiment of the dimple compensation circuit of FIG. 1;

FIG. 6, consisting of a through c, is a set of graphs showing several signals produced by the stacking apparatus of FIG. 1 when it includes the dimple compensation circuit of FIG. 5;

DESCRIPTION OF THE PREFERRED EMBODIMENTS

Figure 1:
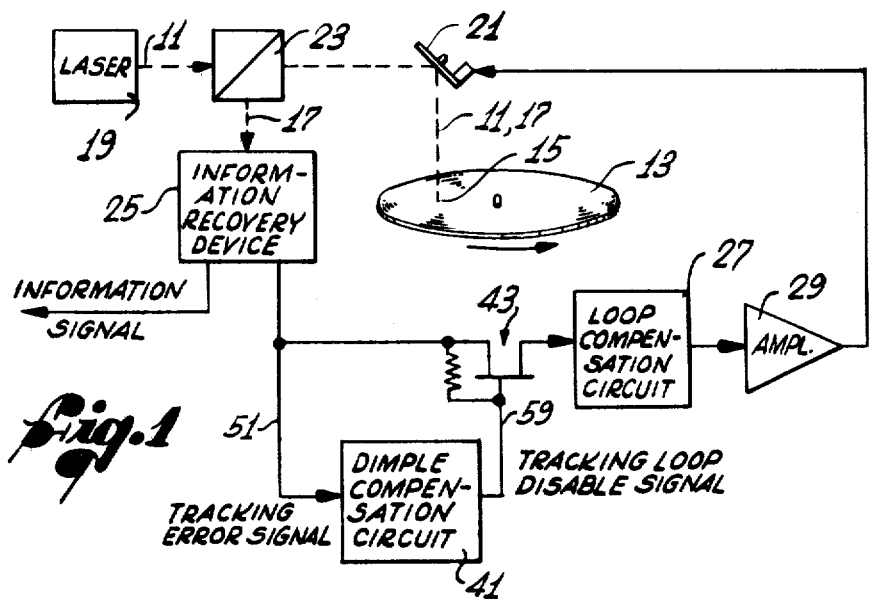
FIG. 1 is a simplified block diagram of tracking apparatus in accordance with the present invention, for maintaining a reading beam of light aligned with a selected track on a video disc.

Referring now to the drawings, and particularly to FIG. 1, there is shown a tracking apparatus for use in a video disc playback machine, for maintaining a reading beam of light 11 aligned with a selected recording track on a video disc 13. The disc includes a plurality of closely-spaced recording tracks arranged in a spiral or concentric circle pattern. The reading beam is focused to a spot 15 aligned with a selected one of these tracks, as the disc is rotated in a prescribed fashion, to produce a reflected beam 17 that is modulated in intensity in accordance with the recorded information.

The apparatus includes a laser 19 for producing the incident reading beam 11, a radial tracking mirror 21 for controllably positioning the reading beam spot 15 at a prescribed radial location on the disc 13, and a beam splitter 23 for separating the reflected beam 17 from the incident beam. The apparatus further includes an information recovery device 25 for monitoring the intensity of the reflected beam and producing both an information signal, corresponding to the modulated intensity of the reflected beam, and a tracking error signal, indicative of the deviation of the incident beam from the centerline of the selected recording track. This tracking error signal is coupled back to the radial tracking mirror 21 via a loop compensation circuit 27 and an amplifier 29, to form a servo for controllably positioning the reading beam spot 15 in alignment with the selected track.

Figure 2:
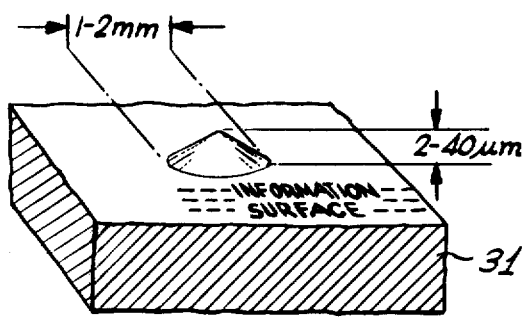
FIG. 2 is a fragmentary perspective view of a portion of a stamper used in molding the video disc of FIG. 1, showing in exaggerated form a dimple in the information-bearing surface of the stamper.

Tracking difficulties arise when the video disc 13 includes defects such as dimples in its information-bearing surface, which cause nearby recording tracks to deviate momentarily from their normal, substantially circular, shape. A typical dimple is generally conically-shaped, with a height of about 2 to 40 microns and a diameter of about 1 to 2 millimeters, extending over several hundred recording tracks. Dimples are believed to be created by the presence of foreign particles beneath a thin, metallic stamper used in molding the video disc. A perspective view of a stamper fragment 31 having such a dimple is shown in FIG. 2.

Figure 3:
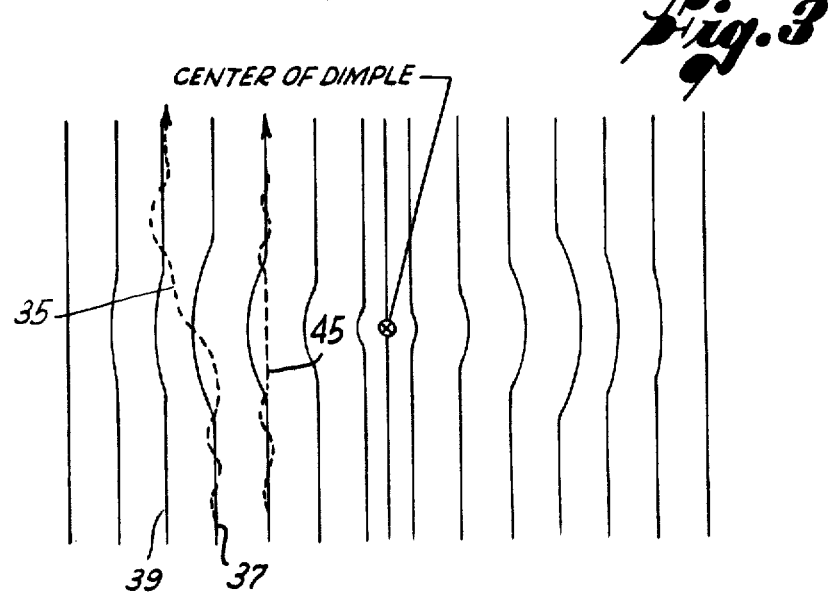
FIG. 3 is a plan view of the portion of a video disc produced by the stamper of FIG. 2, showing in exaggerated form the deviations in the directions of the recording tracks adjacent to the dimple.

The effect a dimple has on the shape of the nearby recording tracks of the video disc 13 is depicted, in exaggerated form, in FIG. 3. It will be observed that on both sides of the dimple, the tracks deviate away from the dimple center.

FIG. 3 also shows, in diagrammatic form at 35, the path of the reading beam spot 15 when typical tracking apparatus typically attempts to maintain the spot continuously aligned with a recording track 37 that is deviating momentarily to the left because of a dimple. Because of the relatively slow response time of the apparatus, however, the spot reaches the deviating track only after the track is moving back to its original alignment. As a result, the spot overshoots the track 37 and becomes aligned with the adjacent track 39.

FIG. 4 depicts a typical tracking error signal that is produced by prior tracking apparatus when a dimple is encountered and the reading beam spot 15 jumps inadvertently to the adjacent track 39. It will be observed that the signal oscillates between relatively large positive and negative values as the spot first strays from the selected track 37 and then overshoots the track to become aligned with the adjacent track.

When scanning tracks on the approaching side of the dimple center, this track-jumping phenomenon will result in the reading beam hanging up on a single pair of tracks and the repeated recovery of the same information from the disc 13. When video information is being recovered, a stop-motion display will result. On the other hand, if by chance the reading beam spot has passed through the dimple center and is scanning a track on its far side, this phenomenon will result in the skipping of some of the tracks. In this case, a fast motion display of the recovered video information will result.

In accordance with the invention, the track-skipping phenomenon described above is eliminated by the inclusion of a dimple compensation circuit 41 in the apparatus of FIG. 1, for monitoring the tracking error signal to determine when a dimple is being scanned, and for producing a corresponding tracking loop disable signal to disable an FET switch 43 used in coupling the tracking error signal to the radial tracking mirror 21. Thus, when a dimple is encountered, the error signal is uncoupled from the mirror and the relative radial location of the reading beam spot 15 remains fixed. This is shown diagramatically at 45 in FIG. 3. After the dimple has been passed, the error signal is once again coupled through the FET switch to the tracking mirror, and the apparatus again functions as a servo to position the reading beam spot in alignment with the selected track.

One preferred embodiment of the dimple compensation circuit 41 is shown in FIG. 5. It includes a first threshold detector 47 and a second threshold detector 49 for comparing the tracking error signal received on line 51 from the information recovery device 25 (FIG. 1) to a pair of fixed thresholds. The first threshold detector compares the signal to a positive threshold (V+), which is controllably selected by a first potentiometer 53, and the second threshold detector compares the signal to a prescribed negative threshold (V−), which is controllably selected by a second potentiometer 55. The output signals of the two threshold detectors are OR'ed together by a pair of diodes 57 to form the tracking loop disable signal for coupling on line 59 to the gate terminal of the FET switch 43. The disable signal is therefore produced whenever the tracking error signal is greater than the V+ threshold or less than the V− threshold.

Whenever the reading beam 11 scans a dimple-free portion of the video disc 13, the tracking error signal will ordinarily be at a level intermediate the V+ and V− thresholds. The switch 43 will therefore remain conductive, and the tracking error signal will be coupled through to it to the radial tracking mirror 21, to controllably position the beam in alignment with the selected track. When the reading beam encounters a dimple, however, the error signal will ordinarily exceed at least one of the two thresholds, and the error signal will be uncoupled from the tracking mirror.

FIG. 6 is a set of graphs showing several signals produced by the tracking apparatus of FIG. 1 when it includes the dimple compensation circuit of FIG. 5. It will be observed that the tracking error signal (FIG. 6a) has a relatively large negative excursion, as the track being scanned deviates away from the reading beam spot 15. The tracking loop disable signal (FIG. 6b) is produced for as long as the tracking error signal exceeds the V− threshold, which is shown superimposed on the error signal in FIG. 6a. The signal actually coupled to the radial tracking mirror 21 (FIG. 6c) is identical to the tracking error signal, except where the disable signal is present, in which case it has a level of zero. As a result, the mirror is not driven either radially inwardly or radially outwardly to any significant degree while the dimple is being scanned, and the reading beam spot 15 will remain substantially at its current radial location.

It should be appreciated that the tracking error signal will not always exceed one of the V+ and V− thresholds for every recording track in the vicinity of a dimple. Although tracks near the periphery of a dimple might have deviating paths, these deviations will have a sufficiently low magnitude that the tracking apparatus can properly follow the tracks for the duration of the dimple.

Figure 7:
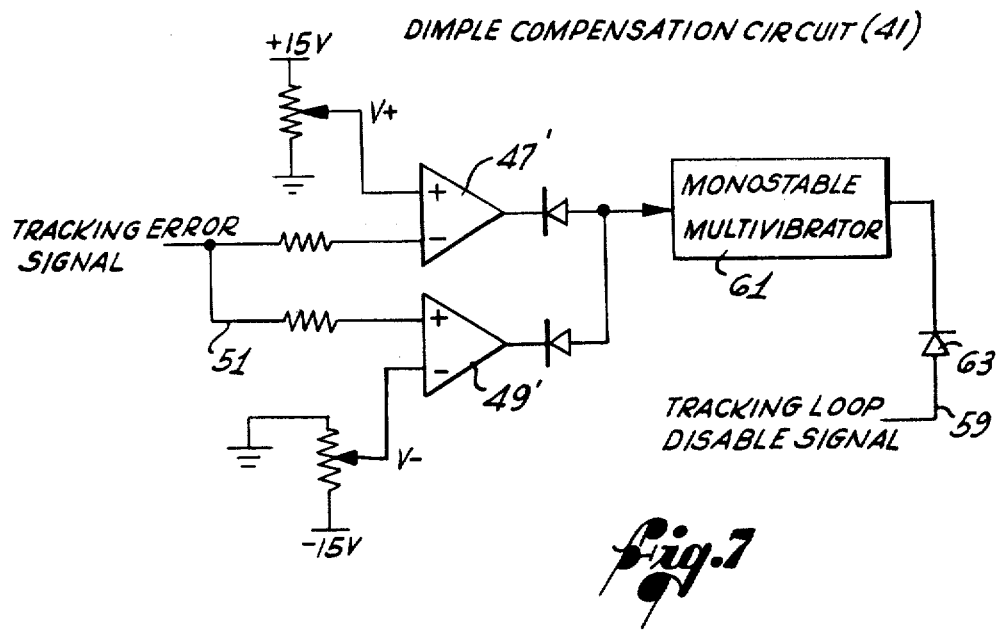
FIG. 7 is a schematic circuit diagram of an alternative embodiment of the dimple compensation circuit of FIG. 1.

An alternative embodiment of the dimple compensation circuit 41 is shown in FIG. 7. Like the circuit of FIG. 5, it includes threshold detectors 47' and 49' for comparing the tracking error signal to prescribed positive and negative thresholds, V+ and V−, respectively. In addition, the circuit includes a monostable multivibrator 61 that is triggered by the output signal of either threshold detector. The multivibrator produces a tracking loop disable signal for coupling through a diode 63 and over line 59 to the gate terminal of the FET switch 43 (FIG. 1). The loop disable signal has a duration T corresponding generally to that of a dimple, about 100 to 200 microseconds in the preferred embodiment. The tracking error signal is therefore uncoupled from the radial tracking mirror for the duration of the dimple.

Figure 8:
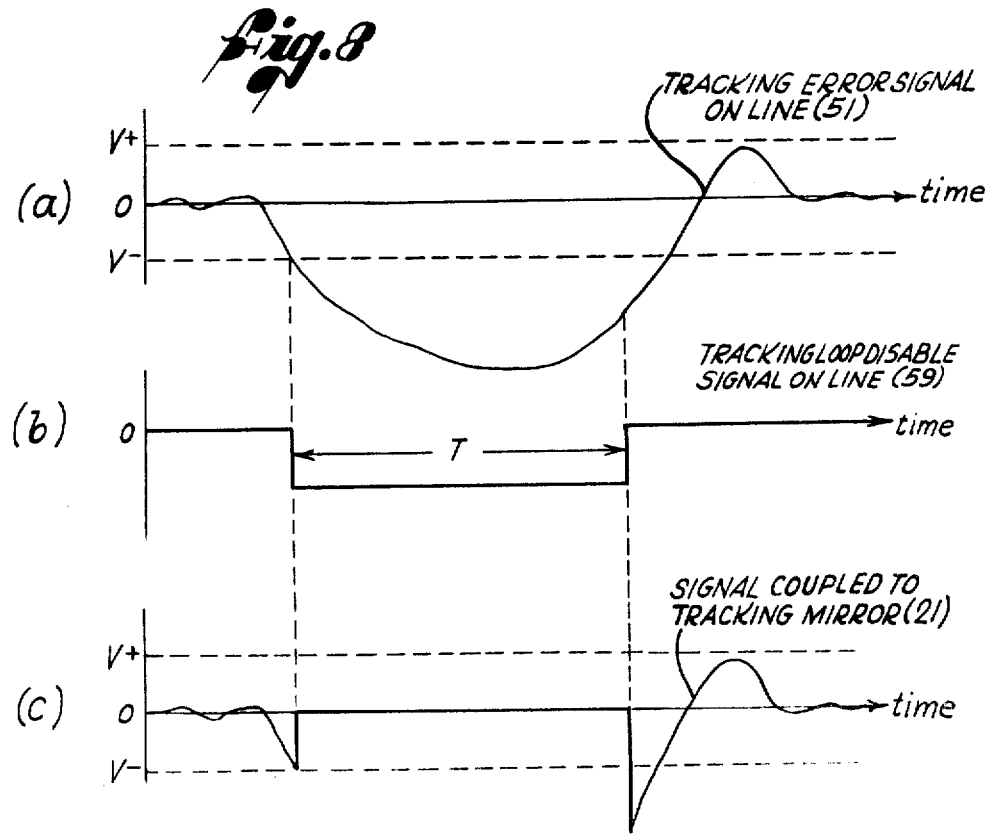
FIG. 8, consisting of a through c, is a set of graphs similar to that of FIG. 6, but showing several signals produced by tracking apparatus that includes the dimple compensation circuit of FIG. 7.

FIG. 8 is a set of graphs showing several signals produced when the tracking apparatus includes the dimple compensation circuit of FIG. 7. The tracking loop disable signal (FIG. 8b) is produced as soon as the tracking error signal (FIG. 8a) first exceeds the V− threshold, and it continues for a duration T. The signal actually coupled to the radial tracking mirror 21 (FIG. 8c) is identical to the tracking error signal, except where the disable signal is present, in which case it has a level of zero.

It should be apparent from the foregoing description that the present invention provides an improved tracking apparatus, which eliminates the track-jumping phenomenon that sometimes occurs when recovering information from record media having defects of a prescribed type. The apparatus scans a selected track on the medium and disables a tracking servo in a prescribed fashion whenever it detects the presence of such a defect. After the defect has been passed, the apparatus enables the servo once again to maintain the reading beam aligned with the selected track.

Although the invention has been described in detail with reference to its presently-preferred embodiments, it should be understood by one of ordinary skill in the art that various modifications can be made, without departing from the spirit and scope of the invention. Accordingly, it is not intended that the invention be limited, except as by the appended claims.

We claim:

1. Tracking apparatus for aligning a scanning reading beam in a prescribed position relative to a selected recording track on a record medium, comprising:
   means for determining the location of the reading beam relative to the selected track on the record medium, and for producing a corresponding tracking error signal;
   beam steering means, responsive to the tracking error signal, for controllably positioning the reading beam in the prescribed position relative to the selected track;
   means for monitoring the tracking error signal and determining when the reading beam is scanning a record medium defect of a type that causes the selected track to deviate momentarily from its normal position, and for starting a corresponding disable signal of a predetermined time duration; and
   means, responsive to the disable signal, for selectively uncoupling the tracking error signal from the beam steering means, whereby the reading beam is maintained in its current position relative to the record medium for the duration of said disable signal,
   said predetermined time duration corresponding to the nominal duration of the defect being scanned by the reading beam.

2. Tracking apparatus as defined in claim 1, wherein the means for monitoring includes threshold detector means for comparing the tracking error signal to a prescribed threshold, the disable signal being produced whenever the error signal exceeds the threshold.

3. Tracking apparatus as defined in claim 1, wherein the means for monitoring includes:
   first threshold detector means for comparing the tracking error signal to a first predetermined threshold, a first signal being produced whenever the first threshold is exceeded;
   second threshold detector means for comparing the tracking error signal to a second prescribed threshold, a second signal being produced whenever the second threshold is exceeded; and
   means for combining the first and second signals in a prescribed fashion, to produce the disable signal.

4. Tracking apparatus as defined in claim 3, wherein the means for combining includes means for OR'ing together the first and second signals, the disable signal thereby being produced whenever the tracking error signal exceeds either the first threshold or the second threshold.

5. Tracking apparatus as defined in claim 3, wherein: the means for combining includes monostable multivibrator means for producing the disable signal, the multivibrator means being triggered by the first and second signals.

6. Tracking apparatus as defined in claim 3, wherein the first and second thresholds are fixed.

7. Tracking apparatus for positioning a reading beam in alignment with a selected track of a plurality of substantially circular and concentric recording tracks on a rotatable video disc, comprising:
   means for determining the location of the reading beam relative to the centerline of the selected track on the video disc, and for producing a corresponding tracking error signal;
   beam steering beams for controllably positioning the reading beam in accordance with the tracking error signal, whereby the reading beam is positioned in alignment with the selected track;
   first threshold detector means for comparing the tracking error signal to a first prescribed threshold, to produce a first signal whenever the first threshold is exceeded;
   second threshold detector means for comparing the tracking error signal to a second prescribed threshold, to produce a second signal whenever the second threshold is exceeded;
   means for combining the first and second signals in a prescribed fashion, to produce a disable signal indicating that the reading beam is impinging on a video disc defect of a prescribed type, said disable signal having a predetermined time duration; and
   switch means, responsive to the disable signal, for selectively uncoupling the tracking error signal from the beam steering means, whereby the reading beam is maintained substantially in its current position whenever it impinges on a video disc defect of the prescribed type,
   said predetermined time duration corresponding to the nominal duration of the defect being scanned by the reading beam.

8. Tracking apparatus as defined in claim 7, wherein the means for combining includes means for OR'ing together the first and second signals, the disable signal thereby being produced whenever the tracking error signal exceeds either the first threshold or the second threshold.

9. Tracking apparatus as defined in claim 7, wherein the means for combining includes:
   means for OR'ing together the first and second signals, to produce a trigger signal; and
   a monostable multivibrator, responsive to the trigger signal, for producing the disable signal, the disable signal having a prescribed duration corresponding to the nominal duration of the defect impinged on by the reading beam.

10. A method for aligning a scanning reading beam in a prescribed position relative to a selected recording track on a record medium, comprising steps of:
    determining the location of the reading beam relative to the selected track on the record medium, and producing a corresponding tracking error signal;
    controllably positioning the reading beam in accordance with the tracking error signal, to align the beam in the prescribed position relative to the selected track;
    monitoring the tracking error signal and determining when the reading beam is scanning a record medium defect of a type that causes the selected track to deviate momentarily from its normal position, and producing a corresponding disable signal having a predetermined time duration corresponding to the nominal duration of the defect being scanned by the reading beam; and
    interrupting the step of controllably positioning, in accordance with the disable signal, whereby the reading beam is maintained in its current position relative to the record medium.

11. A method as defined in claim 10, wherein the step of monitoring includes a step of comparing the tracking error signal to a prescribed threshold, the disable signal being produced whenever the error signal exceeds the threshold.

12. A method as defined in claim 10, wherein the step of monitoring includes steps of:

comparing the tracking error signal to a first prescribed threshold, and producing a first signal whenever the first threshold is exceeded;

comparing the tracking error signal to a second prescribed threshold, and producing a second signal whenever the second threshold is exceeded; and combining the first and second signals in a prescribed fashion, to produce the disable signal.

13. A method as defined in claim 12, wherein the step of combining includes a step of OR'ing together the first and second signals, the disable signal thereby being produced whenever the tracking error signal exceeds either the first threshold or the second threshold.

14. A method as defined in claim 12, wherein the step of combining includes a step of producing the disable signal at the first occurrence of either the first signal or the second signal, the disable signal having a prescribed duration corresponding to the nominal duration of the defect being scanned by the reading beam.

* * * * *